US011973280B2

(12) United States Patent
Wang et al.

(10) Patent No.: US 11,973,280 B2
(45) Date of Patent: Apr. 30, 2024

(54) ANTENNA ELEMENT AND TERMINAL DEVICE

(71) Applicant: VIVO MOBILE COMMUNICATION CO.,LTD., Guangdong (CN)

(72) Inventors: Yijin Wang, Guangdong (CN); Huan-Chu Huang, Guangdong (CN); Xianjing Jian, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 295 days.

(21) Appl. No.: 17/530,375

(22) Filed: Nov. 18, 2021

(65) Prior Publication Data

US 2022/0077582 A1 Mar. 10, 2022

Related U.S. Application Data

(63) Continuation of application No. PCT/CN2020/090101, filed on May 13, 2020.

(30) Foreign Application Priority Data

May 22, 2019 (CN) ........................ 201910430963.8

(51) Int. Cl.
*H01Q 9/04* (2006.01)
*H01Q 1/24* (2006.01)
(Continued)

(52) U.S. Cl.
CPC ............. *H01Q 9/045* (2013.01); *H01Q 1/243* (2013.01)

(58) Field of Classification Search
CPC .......... H01Q 21/26; H01Q 1/38; H01Q 1/246; H01Q 1/243; H01Q 21/24; H01Q 1/50
See application file for complete search history.

(56) References Cited

U.S. PATENT DOCUMENTS

2014/0176378 A1 6/2014 Yu et al.
2015/0130682 A1 5/2015 Jung et al.
(Continued)

FOREIGN PATENT DOCUMENTS

CN 101834345 A 9/2010
CN 102870276 A 1/2013
(Continued)

OTHER PUBLICATIONS

International Search Report of International Application No. PCT/CN2020/090101 dated Aug. 3, 2020.
(Continued)

*Primary Examiner* — Wei (Victor) Y Chan
(74) *Attorney, Agent, or Firm* — IP & T GROUP LLP

(57) ABSTRACT

An antenna element includes: a target metal groove, M feeding components disposed at the bottom of the target metal groove, M feeding arms and a first insulator disposed in the target metal groove, and a target radiator carried by the first insulator. Each feeding component of the M feeding components is electrically connected to a feeding arm, and the M feeding components are isolated from the target metal groove. The M feeding arms are located between the bottom of the target metal groove and the first insulator, and the M feeding arms is distributed along the diagonal direction of the target metal groove. Each feeding arm of the M feeding arms is coupled to the target radiator and the target metal groove, and a resonance frequency of the target radiator is different from a resonance frequency of the target metal groove, and M is a positive integer.

17 Claims, 5 Drawing Sheets

(51) Int. Cl.
*H01Q 1/38* (2006.01)
*H01Q 21/26* (2006.01)

(56) References Cited

U.S. PATENT DOCUMENTS

| | | | | |
|---|---|---|---|---|
| 2016/0285153 | A1 | 9/2016 | Li et al. | |
| 2017/0352960 | A1 | 12/2017 | Zhang | |
| 2018/0138591 | A1 | 5/2018 | Kim et al. | |
| 2018/0309186 | A1 | 10/2018 | Yu et al. | |
| 2020/0161748 | A1* | 5/2020 | Isik | H01Q 5/42 |
| 2021/0218155 | A1 | 7/2021 | Huang et al. | |
| 2022/0359989 | A1* | 11/2022 | Wang | H01Q 21/08 |
| 2023/0017375 | A1* | 1/2023 | Wu | H01Q 1/246 |

FOREIGN PATENT DOCUMENTS

| | | | |
|---|---|---|---|
| CN | 102956956 | A | 3/2013 |
| CN | 103633426 | A | 3/2014 |
| CN | 103904414 | A | 7/2014 |
| CN | 105119051 | A | 12/2015 |
| CN | 106654529 | A | 5/2017 |
| CN | 108400424 | A | 8/2018 |
| CN | 108899648 | A | 11/2018 |
| CN | 109037906 | A | 12/2018 |
| CN | 109066055 | A | 12/2018 |
| CN | 208460971 | U | 2/2019 |
| CN | 208706842 | U | 4/2019 |
| CN | 109728421 | A | 5/2019 |
| CN | 110137675 | A | 8/2019 |
| EP | 2477275 | A1 | 7/2012 |
| EP | 3098903 | A1 | 11/2016 |

OTHER PUBLICATIONS

Written Opinion of The International Searching Authority of International Application No. PCT/CN2020/090101 dated Aug. 3, 2020.

First Office Action of Priority Application No. 201910430963.8 dated Mar. 3, 2020.

The Second Office Action of Priority Application No. 201910430963.8 dated Sep. 7, 2020.

The Third Office Action of Priority Application No. 201910430963.8 dated Nov. 25, 2020.

Guo Y et al., 60-GHz LTCC Antenna Arrays, Ultra-Wideband and GHz Communications for Biomedical Applicatons, Oct. 16, 2013, pp. 211-239.

Deng H et al., Analysis and Design of a Novel Short Bifilar Helix Element, Oct. 2015, pp. 48-51.

Hang Wong et al., Design of Dual-Polarized L-Probe Patch Antenna Arrays With High Isolation, IEEE Transactions on Antennas and Propagation, Jan. 2004, p. 45-52, vol. 52, No. 1, IEEE.

Extended European Search Report for European Patent Application No. 20808657.9 issued by the European Patent Office dated Jun. 3, 2022.

* cited by examiner

ANTENNA ELEMENT AND TERMINAL DEVICE

CROSS-REFERENCE OF RELATED APPLICATIONS

This application is a Bypass Continuation Application of PCT/CN2020/090101 filed on May 13, 2020, which claims priority to Chinese Patent Application No. 201910430963.8 filed on May 22, 2019, which are incorporated herein by reference in their entirety.

TECHNICAL FIELD

The embodiments of the present disclosure relate to the field of communications technologies, and in particular, to an antenna element and a terminal device.

BACKGROUND

With development of fifth-generation (5G) mobile communication systems and widespread application of terminal devices, millimeter-wave antennas are gradually used in various terminal devices, to meet increasing usage requirements of users.

Currently, millimeter-wave antennas in terminal devices are mainly implemented through the antenna in package (AIP) technology. For example, as shown in FIG. 1, the AIP technology may be used to package an array antenna 11 whose operating wavelength is a millimeter wave, a radio frequency integrated circuit (RFIC) 12, a power management integrated circuit (PMIC) 13, and a connector 14 into a module 10. The module 10 may be called a millimeter-wave antenna module. An antenna in the array antenna may be a patch antenna, a Yagi-Uda antenna, or a dipole antenna.

However, since the antenna in the array antenna is usually a narrowband antenna (such as the patch antenna listed above), a band covered by each antenna is limited, but there are usually many millimeter-wave bands planned in a 5G system, such as an n257 (26.5 to 29.5 GHz) band mainly characterized by 28 GHz and an n260 (37.0 to 40.0 GHz) band mainly characterized by 39 GHz. Therefore, traditional millimeter-wave antenna modules may not be able to cover mainstream millimeter-wave bands planned in the 5G system. As a result, antenna performance of the terminal device is poor.

SUMMARY

According to a first aspect, an embodiment of the present disclosure provides an antenna element. The antenna element includes a target metal groove, M feeding components disposed at the bottom of the target metal groove, M feeding arms and a first insulator disposed in the target metal groove, and a target radiator carried by the first insulator. Each feeding component of the M feeding components is electrically connected to a feeding arm, the M feeding components are isolated from the target metal groove, the M feeding arms are located between the target metal groove and the first insulator, the M feeding arms are distributed along the diagonal direction of the target metal groove, each feeding arm of the M feeding arms is coupled to the target radiator and the target metal groove, the resonance frequency of the target radiator is different from the resonance frequency of the target metal groove, and M is a positive integer.

According to a second aspect, an embodiment of the present disclosure provides a terminal device, and the terminal device includes the antenna element in the first aspect.

Figure 1:
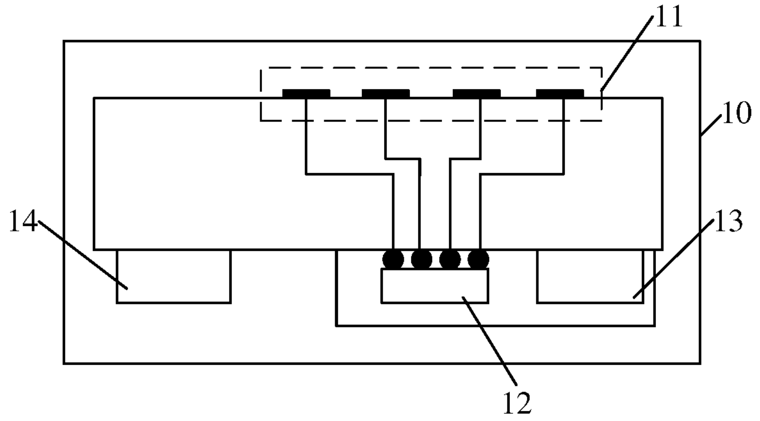
FIG. 1 is a schematic structural diagram of a traditional millimeter-wave antenna according to an embodiment of the present disclosure.

Description of reference numerals: 10—millimeter-wave antenna module; 11—array antenna whose operating wavelength is a millimeter-wave; 12—RFIC; 13—PMIC; 14—connector; 201—target metal groove; 201*a*—first metal groove; 201*b*—second metal groove; 202—feeding component; 203—feeding arm; 203*a*—first component of the feeding arm; 203*b*—second component of the feeding arm; 204—target radiator; 205—first insulator; 207—through hole; 208—third insulator; L1—diagonal of the target metal groove; L2—diagonal of the first metal groove; L3—the other diagonal of the first metal groove; 4—terminal device; 40—housing; 41—first metal frame; 42—second metal frame; 43—third metal frame; 44—fourth metal frame; 45—ground plate; 46—first antenna; and 47—first groove.

It should be noted that in the embodiments of the present disclosure, coordinate axes in the coordinate system shown in the accompanying drawings are orthogonal to each other.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the specification and claims of the present disclosure, the terms “first”, “second”, and so on are intended to distinguish between different objects, but do not describe a particular order of the objects. For example, the first metal groove, the second metal groove, and the like are used to distinguish between different metal grooves, and are not used to describe a particular sequence of the metal grooves.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

In the description of the embodiments of the present disclosure, unless otherwise specified, the meaning of "a plurality of" means two or more. For example, multiple antennas mean two or more antennas.

The following describes some terms/nouns used in the embodiments of the present disclosure.

Coupling refers to close cooperation and mutual influence between inputs and outputs of two or more circuit elements or electrical networks, and energy transmission from one side to the other side through interaction.

An AC signal refers to a signal of which the current direction changes.

Beamforming refers to a technology that adjusts a weighting coefficient of each antenna element in an antenna array, so that the antenna array generates a directional beam and obtains an obvious array gain.

Vertical polarization refers to that a direction of intensity of an electric field formed when an antenna radiates is perpendicular to the ground plane.

Horizontal polarization refers to that a direction of intensity of an electric field formed when an antenna radiates is in parallel with the ground plane.

A multiple-input multiple-output (MIMO) technology refers to a technology that uses multiple antennas to transmit or receive signals at a transmission end (that is, a sending end and a receiving end) to improve the quality of communication. In this technology, signals may be sent or received through multiple antennas at the transmission end.

Relative permittivity is a physical parameter used to represent the dielectric properties or polarization properties of dielectric materials.

A ground plate refers to a part of a terminal device that may be used as a virtual ground, for example, a printed circuit board (PCB) of the terminal device or a display screen of the terminal device.

A cellular antenna refers to an antenna used to communicate with a terminal device via an antenna beam with width, azimuth, and downtilt in a terrestrial cellular communication system.

The embodiments of the present disclosure provide an antenna element and a terminal device. The antenna element may include a target metal groove, M feeding components disposed at the bottom of the target metal groove, M feeding arms and a first insulator disposed in the target metal groove, and a target radiator carried by the first insulator. Each feeding component of the M feeding components is electrically connected to a feeding arm, the M feeding components are isolated from the target metal groove, the M feeding arms are located between the bottom of the target metal groove and the first insulator, the M feeding arms are distributed along the diagonal direction of the target metal groove, each feeding arm of the M feeding arms is coupled to the target radiator and the target metal groove, a resonance frequency of the target radiator is different from a resonance frequency of the target metal groove, and M is a positive integer. In this solution, on the one hand, since the feeding arm is coupled to the target radiator and the target metal groove, when the feeding arm receives an AC signal, the feeding arm may be coupled to the target radiator and the target metal groove. Therefore, the target radiator and the target metal groove may generate induced AC signals, so that the feeding arm, the target radiator, and the target metal groove generate electromagnetic waves of a particular frequency. On the other hand, because the target radiator and the target metal groove generate induced currents at different positions (paths through which currents flow are different), frequencies of electromagnetic waves generated by the current on the feeding arm through the target radiator and the target metal groove are also different, so that the antenna element may cover different bands, that is, the band covered by the antenna element may be increased. On the other hand, because the M feeding arms are located between the bottom of the target metal groove and the first insulator, and the M feeding arms are distributed along the diagonal direction of the target metal groove, the volume of the antenna element may be appropriately reduced while the performance of the antenna element may be ensured, thereby making the structure of the antenna element more compact. In this way, since the band covered by the antenna element may be increased and compactness of the structure of the antenna element may be increased, the performance of the antenna element may be improved.

The antenna element provided in the embodiments of the present disclosure may be applied to the terminal device, or may be applied to another electronic device that needs to use the antenna element. This may be determined according to an actual usage requirement, and is not limited in the embodiments of the present disclosure. The following uses an example in which the antenna element is applied to the terminal device, to provide exemplary description of the antenna element provided in the embodiments of the present disclosure.

The following provides exemplary description of the antenna element provided in the embodiments of the present disclosure with reference to accompanying drawings.

Figure 2:
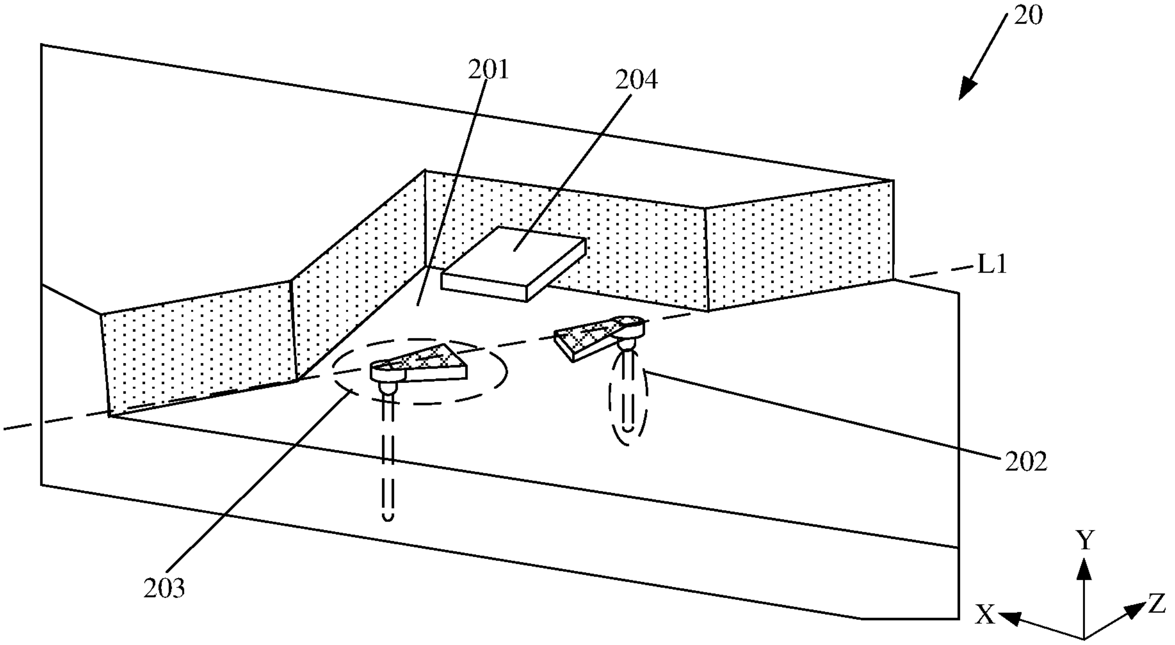
FIG. 2 is a first cutaway view of a part of an antenna element according to an embodiment of the present disclosure.

As shown in FIG. 2, the antenna element 20 may include a target metal groove 201, M feeding components 202 disposed at the bottom of the target metal groove 201, M feeding arms 203 and a first insulator disposed in the target metal groove 201 (not shown in FIG. 2), and a target radiator 204 carried by the first insulator.

Each feeding component 202 of the M feeding components may be electrically connected to a feeding arm 203, the M feeding components 202 may be isolated from the target metal groove 201, the M feeding arms 203 may be located between the bottom of the target metal groove 201 and the first insulator, the M feeding arms may be distributed along the diagonal direction L1 of the target metal groove 201, each feeding arm 203 of the M feeding arms may be coupled to the target radiator 204 and the target metal groove 201, the resonance frequency of the target radiator 204 is different from the resonance frequency of the target metal groove 201, and M is a positive integer.

It may be understood that the target metal groove may also be used as a radiator in the antenna element provided in the embodiments of the present disclosure.

In the present disclosure, the coupling between the M feeding arms and the target metal groove may be: the M feeding arms are coupled to the bottom of the target metal groove.

It should be noted that in the embodiments of the present disclosure, to more clearly illustrate the structure of the antenna element, FIG. 2 is a cutaway view of a part of an antenna element according to an embodiment of the present disclosure. FIG. 2 shows the M feeding arms and the target radiator while removing the first insulator (that is, the first insulator is not shown in FIG. 2). In actual implementation, the first insulator is disposed in the target metal groove, the target radiator may be carried on the first insulator, and the feeding arm is located between the first insulator and the target metal groove. That is, the target metal groove, the feeding arm, the feeding component, the first insulator, and the target radiator carried on the first insulator form a whole to form the antenna element provided by the embodiments of the present disclosure.

In addition, since the feeding component is disposed at the bottom of the first metal groove, to clearly illustrate the relationship between various components in the antenna element, the feeding component 202 in FIG. 2 is illustrated by a dashed line.

Optionally, in an embodiment of the present disclosure, the diagonal of the target metal groove may be a diagonal of a cross section of the target metal groove in parallel with a surface on which an opening of the target metal groove is located.

To more clearly describe the antenna element provided in the embodiments of the present disclosure and the working principle thereof, the following takes an antenna element as an example to illustrate the working principle of signal sending and receiving by the antenna element provided in the embodiments of the present disclosure.

Exemplarily, with reference to FIG. 2, in the embodiments of the present disclosure, when the terminal device sends a 5G millimeter-wave signal, a signal source in the terminal device sends an AC signal, and the AC signal may be transmitted to the feeding arm through the feeding component. Then, after the feeding arm receives the AC signal, on the one hand, the feeding arm may be coupled to the target radiator, so that an induced AC signal is generated on the target radiator. Then, the target radiator may radiate an electromagnetic wave of a particular frequency. On the other hand, the feeding arm may also be coupled to the target metal groove, so that the target metal groove generates an induced AC signal, and then the target metal groove may radiate an electromagnetic wave of a particular frequency (since the target radiator and the target metal groove generate the induced AC signals at different positions (that is, paths through which the AC signals flow are different), the frequencies of the electromagnetic waves generated by the AC signal on the feeding arm through the target radiator and the target metal groove are also different). In this way, the terminal device may send a signal through the antenna element provided by the embodiments of the present disclosure.

Exemplarily, in the embodiments of the present disclosure, when the terminal device receives a 5G millimeter-wave signal, electromagnetic waves in the space of the terminal device may excite the target radiator and the target metal groove, so that the target radiator and the target metal groove generate induced AC signals. After the target radiator and the target metal groove generate the induced AC signals, the target radiator and the target metal groove may be coupled to the feeding arm respectively, so that the feeding arm generates an induced AC signal. Then, the feeding arm may input the AC signal to a receiver in the terminal device through the feeding component, so that the terminal device may receive a 5G millimeter-wave signal sent by another device. That is, the terminal device may receive signals through the antenna element provided by the embodiments of the present disclosure.

The embodiments of the present disclosure provide an antenna element. On the one hand, since the feeding arm is coupled to the target radiator and the target metal groove, when the feeding arm receives an AC signal, the feeding arm may be coupled to the target radiator and the target metal groove. Therefore, the target radiator and the target metal groove may generate induced AC signals, so that the feeding arm, the target radiator, and the target metal groove generate electromagnetic waves of a particular frequency. In addition, because the target radiator and the target metal groove generate induced currents at different positions (paths through which currents flow are different), frequencies of electromagnetic waves generated by the current on the feeding arm through the target radiator and the target metal groove are also different, so that the antenna element may cover different bands, that is, the band covered by the antenna element may be increased. On the other hand, because the M feeding arms are located between the bottom of the target metal groove and the first insulator, and the M feeding arms are distributed along the diagonal direction of the target metal groove, the volume of the antenna element may be appropriately reduced while the performance of the antenna element may be ensured, thereby making the structure of the antenna element more compact. In this way, since the band covered by the antenna element may be increased and compactness of the structure of the antenna element may be increased, the performance of the antenna element may be improved.

Figure 3:
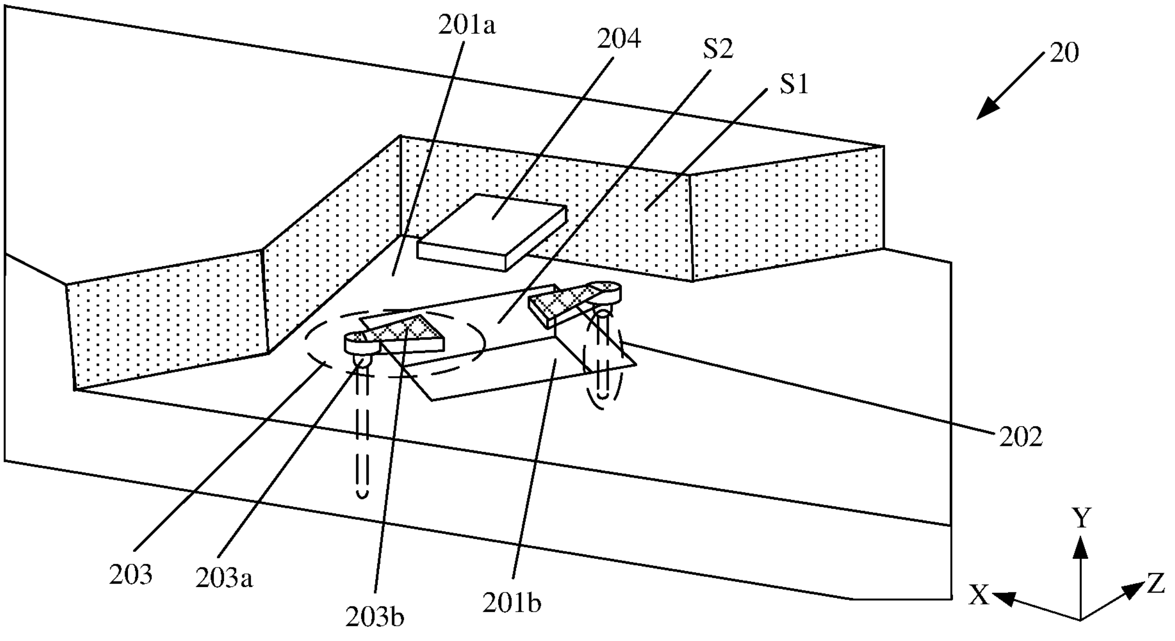
FIG. 3 is a second cutaway view of a part of an antenna element according to an embodiment of the present disclosure.

Optionally, in an embodiment of the present disclosure, with reference to FIG. 2, as shown in FIG. 3, the target metal groove may include a first metal groove 201*a* and a second metal groove 201*b* that is disposed at the bottom of the first metal groove 201*a*.

A first side wall S1 of the first metal groove 201*a* is not in parallel with a second side wall S2 of the second metal groove 201*b*, the M feeding components 202 are disposed at the bottom of the first metal groove 201*a*, the M feeding arms 203 and the first insulator are disposed in the first metal groove 201*a*, and each feeding arm 203 of the M feeding arms are coupled to the target radiator 204 and the second metal groove 201*b*.

In the present disclosure, the first side wall of the first metal groove and the second side wall of the second metal groove are not in parallel with each other, which may be understood as: the second metal groove rotates by a preset angle relative to the first metal groove, where the angle between the first side wall and the second side wall may be a preset angle.

Optionally, in the embodiments of the present disclosure, in a first possible implementation, the first side wall may be any side wall of the first metal groove, and the second side wall may be any side wall of the second metal groove. In a second possible implementation, the first side wall and the second side wall may be two side walls of the first metal groove and the second metal groove in the same direction. This may be determined according to an actual usage requirement, and is not limited in the embodiments of the present disclosure.

In the embodiments of the present disclosure, the preset angle may be determined according to the performance of the antenna element provided by the embodiments of the present disclosure.

Optionally, in the embodiments of the present disclosure, the preset angle may be greater than 0 degrees. This may be determined according to an actual usage requirement, and is not limited in the embodiments of the present disclosure.

Optionally, in an embodiment of the present disclosure, when the first metal groove and the second metal groove are rectangular grooves, the preset angle may be greater than 0 degrees and less than or equal to 45 degrees.

It should be noted that in the embodiments of the present disclosure, the positional relationship between the first side wall and the second side wall when the preset angle is greater than 45 degrees and less than or equal to 90 degrees is the same with the positional relationship between the first side wall and the second side wall when the preset angle is greater than 0 degrees and less than or equal to 45 degrees. Correspondingly, when the preset angle is greater than 90 degrees and less than or equal to 135 degrees; or the preset angle is greater than 135 degrees and less than or equal to 180 degrees; or the preset angle is greater than 180 degrees and less than or equal to 225 degrees; or the preset angle is greater than 225 degrees and less than or equal to 270 degrees; or the preset angle is greater than 270 degrees and less than or equal to 315 degrees; or when the preset angle is greater than 315 degrees and less than or equal to 360 degrees, the positional relationship between the first side wall and the second side wall is the same with the positional relationship between the first side wall and the second side wall when the preset angle is greater than 0 degrees and less than or equal to 45 degrees.

Exemplarily, as shown in FIG. 3, the angle between the first side wall S1 of the first metal groove 201*a* and the second side wall S2 of the second metal groove 201*b* is 45 degrees, that is, the second metal groove 201*b* is rotated by 45 degrees relative to the first metal groove 201*a*.

In the embodiments of the present disclosure, the target metal groove is disposed as two metal grooves, namely, the first metal groove and the second metal groove, the M feeding components are disposed at the bottom of the first metal groove, the first insulator and the M feeding arms are arranged in the first metal groove, and the M feeding arms and the second metal groove are coupled to each other, so that the two metal grooves may perform different functions in the antenna element, thereby reducing interference between various components in the antenna element, for example, reducing interference caused by components disposed in the first metal groove in a process of coupling the second metal groove to the M feeding arms.

Optionally, in the embodiments of the present disclosure, the first metal groove and the second metal groove may be rectangular grooves.

For example, the first metal groove and the second metal groove may be square grooves.

Optionally, in the embodiments of the present disclosure, the shape of the opening of the first metal groove may be the same as the shape of the opening of the second metal groove, or may be different from the shape of the opening of the second metal groove. This may be determined according to an actual usage requirement, and is not limited in the embodiments of the present disclosure.

Exemplarily, the shape of the opening of the first metal groove may be a square, and the shape of the opening of the second metal groove may also be a square.

Certainly, in actual implementation, the shape of the opening of the first metal groove and the shape of the opening of the second metal groove may also be any possible shapes, which may be determined according to actual use requirements and is not limited in the embodiments of the present disclosure.

In the embodiments of the present disclosure, since the maximum radiation directions of electromagnetic waves generated by the target radiator and the second metal groove are the direction of the opening of the first metal groove, when the first metal groove and the second metal groove are grooves of the same shape, the target radiator and the second metal groove may radiate electromagnetic waves of the same beam shape, so that beamforming may be facilitated and the antenna performance of the terminal device may be easily controlled.

Optionally, in an embodiment of the present disclosure, the opening of the first metal groove may be larger than the opening of the second metal groove. That is, the area of the opening of the first metal groove may be larger than the area of the opening of the second metal groove.

In the present disclosure, since the second metal groove is disposed at the bottom of the first metal groove and the area of the opening of the first metal groove is equal to the area of the bottom of the first metal groove, the opening of the first metal groove is larger than that of the second metal groove, which may prevent the second metal groove from being blocked by the first metal groove.

Certainly, in actual implementation, the opening of the first metal groove may also be smaller than or equal to the opening of the second metal groove, which may be determined according to actual usage requirements and is not limited in the embodiments of the present disclosure.

In an embodiment of the present disclosure, since the second metal groove is disposed at the bottom of the first metal groove, and the opening of the first metal groove is larger than the opening of the second metal groove, the manufacturing process of the antenna element may be simplified.

Optionally, in an embodiment of the present disclosure, the M feeding components may be arranged at the bottom of the first metal groove 201*a* and penetrate through the bottom of the first metal groove 201*a*.

It should be noted that in actual implementation, as shown in FIG. 3, in the embodiments of the present disclosure, a first end of the feeding component 202 may be electrically connected to the feeding arm 203, and a second end of the feeding component 202 may be electrically connected to a signal source of the terminal device. In this way, the current of the signal source of the terminal device may be transmitted to the feeding arm through the feeding component, and then coupled to the target radiator and the second metal groove through the feeding arm. That is, the target radiator and the second metal groove may generate induced currents, so that the target radiator and the second metal groove may generate electromagnetic waves. In this way, the antenna element provided by the embodiments of the present disclosure may radiate a 5G millimeter-wave signal in the terminal device.

In an embodiment of the present disclosure, since the terminal device may transmit signals to the feeding arm through the feeding component and the feeding arm may transmit signals to the terminal device through the feeding component, the feeding component may be disposed at the bottom of the first metal groove and penetrates through the bottom of the first metal groove, so that one end of the feeding component is electrically connected to the signal source of the terminal device and the other end of the feeding component is electrically connected to the feeding arm.

Optionally, in the embodiments of the present disclosure, in a first possible implementation, as shown in FIG. 3, each feeding arm 203 of the M feeding arms may include two components: a first component 203*a* and a second component 203*b*. The first component 203*a* may be connected to the feeding component 202, and the second component 203*b* may be connected to the first component 203*a*.

In the embodiments of the present disclosure, since an impedance of the millimeter-wave signal may jump when the feeding component transmits the millimeter-wave signal to the feeding arm, the first component may be used to buffer the millimeter-wave signal transmitted by the feeding component to the feeding arm. After the first component buffers the millimeter-wave signal, the buffered millimeter-wave signal is then transmitted to the second component. This may avoid that the impedance of the millimeter-wave signal transmitted by the feeding component to the feeding arm jumps, so that the working performance of the antenna element provided by the embodiments of the present disclosure may be ensured.

Optionally, in the embodiments of the present disclosure, in a second possible implementation, each feeding arm of the M feeding arms may be a metal piece. Exemplarily, each feeding arm of the M feeding arms may be a copper sheet.

Optionally, in the embodiments of the present disclosure, the shape of the M feeding arms may be rectangle.

Certainly, in actual implementation, the M feeding arms may also include any other possible implementations, which may be determined according to actual use requirements and is not limited in the embodiments of the present disclosure.

In the embodiments of the present disclosure, because feeding arms of different shapes, materials, and structures may have different effects on the working performance of the antenna element, an appropriate feeding arm may be selected according to actual use requirements to make the antenna element work in an appropriate frequency range.

Optionally, in the embodiments of the present disclosure, the M feeding arms may be two feeding arms, and the two feeding arms may be disposed opposite to each other in the target metal groove.

Optionally, in the embodiments of the present disclosure, when the target metal groove includes the first metal groove and the second metal groove, the two feeding arms may be disposed opposite to each other in the first metal groove.

Figure 4:
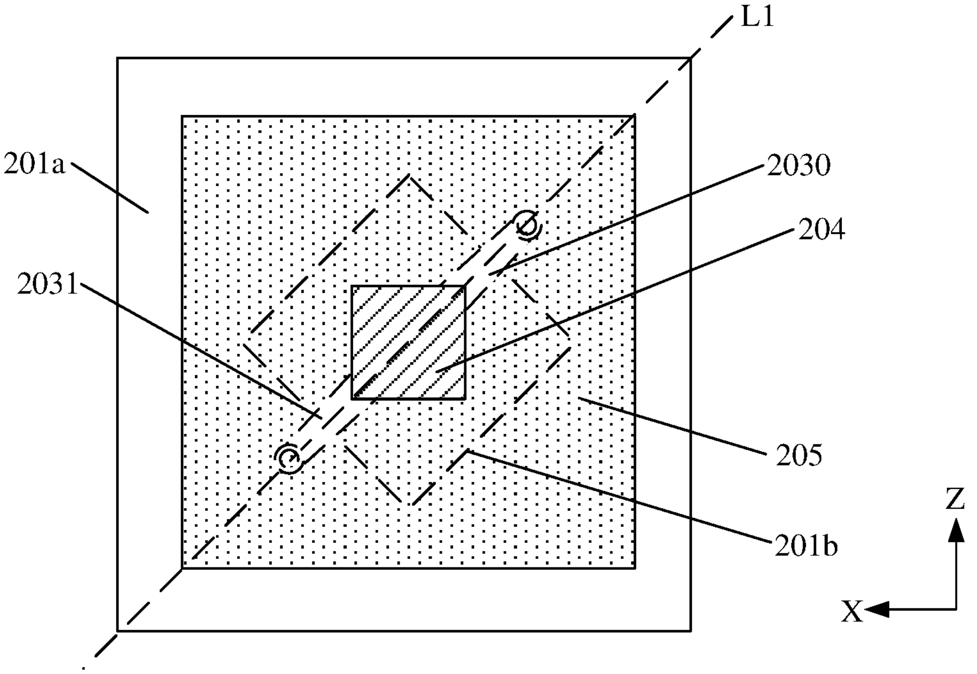
FIG. 4 is a first top view of an antenna element according to an embodiment of the present disclosure.

Exemplarily, FIG. 4 is a top view of the antenna element in a negative direction of the Y-axis according to the embodiments of the present disclosure (for example, the coordinate system shown in FIG. 3). As shown in FIG. 4, the first insulator 205 is disposed in the first metal groove 201*a*, the first insulator 205 carries the target radiator 204, and the feeding arm 2030 and the feeding arm 2031 disposed opposite to each other are located between the first insulator and the first metal groove 201*a*.

It should be noted that when the antenna element provided by the embodiments of the present disclosure is viewed from above, neither the second metal groove nor the feeding arm is visible. Therefore, to accurately illustrate the relationship between the components, the feeding arm (including the feeding arm 2030 and the feeding arm 2031) and the second metal groove 201*b* in FIG. 4 are shown in dashed lines. In addition, since FIG. 4 is a top view of the antenna element on the negative direction of the Y axis according to the embodiments of the present disclosure, the coordinate system shown in FIG. 4 only shows the X-axis and Z-axis.

In addition, since the first insulator is disposed in the first metal groove, 201*a* in FIG. 4 indicates the edge of the opening of the first metal groove, to indicate that the first insulator 205 is disposed in the opening of the first metal groove 201*a*. Besides, as may be seen from FIG. 4, the feeding arm 2030 and the feeding arm 2031 are distributed on the diagonal L1 of the first metal groove 201*a*.

In the embodiments of the present disclosure, since each feeding component is electrically connected to a feeding arm and the two feeding arms are disposed opposite to each other in the target metal groove, the M feeding components may be disposed opposite to each other in at the bottom of the target metal groove.

Optionally, in the embodiments of the present disclosure, amplitudes of signal sources that are connected to the two feeding components that are electrically connected to the two feeding arms are the same, and phases of the signal sources differ by 180 degrees.

It should be noted that in the embodiments of the present disclosure, when one feeding arm of the two feeding arms is in a working state, the other feeding arm may also be in a working state.

Optionally, in the embodiments of the present disclosure, an axis of symmetry of the two feeding arms may be in parallel with a diagonal of the target radiator.

Certainly, in actual implementation, the two feeding arms may also be distributed in the target metal groove in other distribution manners. This may be determined according to an actual usage requirement, and is not limited in the embodiments of the present disclosure.

Optionally, in the embodiments of the present disclosure, the M feeding arms comprises four feeding arms (that is, M=4), the four feeding arms may form two feeding arm groups, and each feeding arm group may include two feeding arms.

In the embodiments of the present disclosure, since the antenna element provided by the embodiments of the present disclosure includes two feeding arm groups, the antenna element provided by the embodiments of the present disclosure may satisfy the principle of the MIMO technology, thereby improving the communication capacity and the communication rate of the antenna element.

Figure 5:
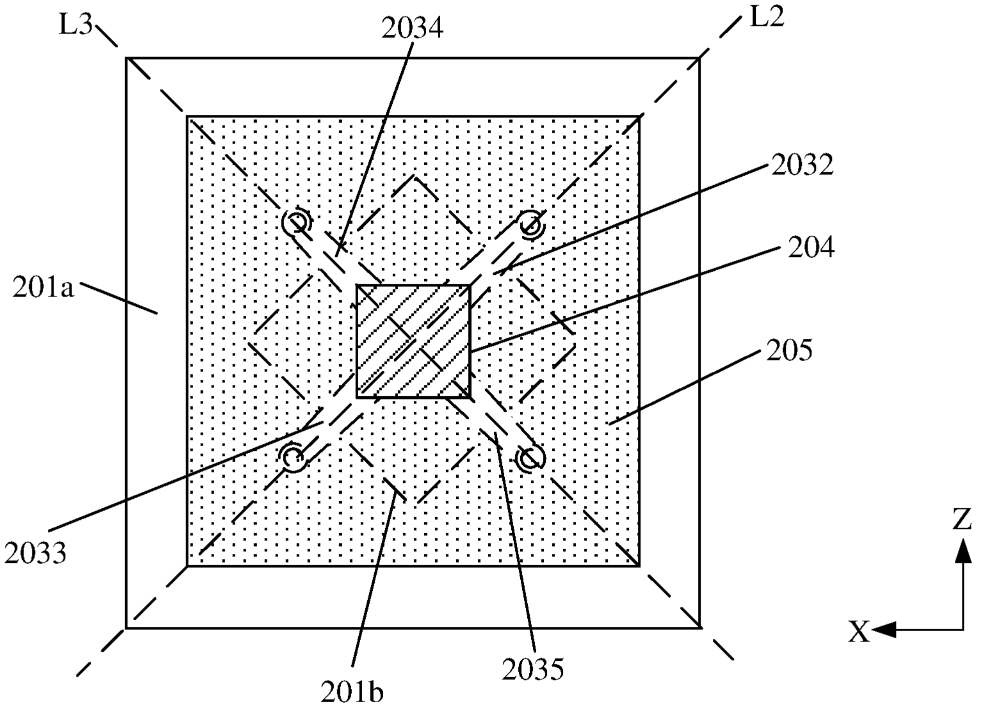
FIG. 5 is a second top view of an antenna element according to an embodiment of the present disclosure.

In the embodiments of the present disclosure, as shown in FIG. 5, one feeding arm group may include a feeding arm 2032 and a feeding arm 2033, and the other feeding arm group may include a feeding arm 2034 and a feeding arm 2035. The feeding arm group formed by the feeding arm 2032 and the feeding arm 2033 may be a feeding arm group of a first polarization; and the feeding arm group formed by the feeding arm 2034 and the feeding arm 2035 may be a feeding arm group of a second polarization.

In the embodiments of the present disclosure, the two feeding arm groups may be two different polarization feeding arm groups, that is, the first polarization and the second polarization may be polarization in different directions.

It should be noted that, in the embodiments of the present disclosure, the polarization forms of the two feeding arm groups may be any possible polarization forms. This may be determined according to an actual usage requirement, and is not limited in the embodiments of the present disclosure.

In the embodiments of the present disclosure, since the two feeding arm groups may be two different polarization feeding arm groups, the antenna element provided by the embodiments of the present disclosure may form a dual-polarized antenna element. This may reduce the probability of communication disconnection of the antenna element, that is, may improve the communication capability of the antenna element.

Optionally, in the embodiments of the present disclosure, the two feeding arm groups may include a first feeding arm group and a second feeding arm group, feeding arms in the first feeding arm group may be distributed on a first diagonal of the target metal groove, and feeding arms in the second feeding arm group are distributed on a second diagonal of the target metal groove.

Optionally, in an embodiment of the present disclosure, the first diagonal and the second diagonal may be two diagonals of a cross section of the target metal groove in parallel with a surface on which an opening of the target metal groove is located.

It may be understood that the feeding arms in the two feeding arm groups may be located on the same plane.

In the embodiments of the present disclosure, when each feeding arm of the M feeding arms is spaced from the radiator (for example, the target radiator or the target metal groove) by a same distance, it is convenient to control parameters of coupling between the M feeding arms and the radiator, for example, an induced current generated during the coupling process. Therefore, the two feeding arm groups may be set on the same plane, so that the working status of the antenna element provided in the embodiments of the present disclosure may be easily controlled.

Optionally, in the embodiments of the present disclosure, the first diagonal and the second diagonal may be two orthogonal diagonals in the target metal groove.

Optionally, in the embodiments of the present disclosure, when the target metal groove includes the first metal groove and the second metal groove, the feeding arms in the first feeding arm group may be distributed on one diagonal of the first metal groove, and the feeding arms in the second feeding arm group may be distributed on the other diagonal of the first metal groove.

Exemplarily, it is assumed that the target metal groove includes the first metal groove and the second metal groove and the shape of the opening of the first metal groove and the shape of the opening of the second metal groove are square, the first feeding arm group includes the feeding arm 2032 and the feeding arm 2033, and the second feeding arm group includes the feeding arm 2034 and the feeding arm 2035. In this case, as shown in FIG. 5, the feeding arm 2032 and the feeding arm 2033 may be distributed on one diagonal L2 of the first metal groove 201*a*, and the feeding arm 2034 and the feeding arm 2035 may be distributed on the other diagonal L3 of the first metal groove 201*a*. In this way, the feeding arms included in the first feeding arm group are orthogonal to the feeding arms included in the second feeding arm group.

Optionally, in the embodiments of the present disclosure, amplitudes of signal sources (which may be a 5G millimeter-wave signal source) connected to two feeding components that are electrically connected to the two feeding arms in the first feeding arm group may be the same, and phases of the signal sources connected to the two feeding components that are electrically connected to the two feeding arms may differ by 180 degrees.

Correspondingly, amplitudes of signal sources connected to two feeding components that are electrically connected to the two feeding arms in the second feeding arm group may also be the same, and phases of the signal sources connected to the two feeding components that are electrically connected to the two feeding arms may also differ by 180 degrees.

In the embodiments of the present disclosure, when one feeding arm in the first feeding arm group is in a working state, the other feeding arm in the first feeding arm group may also be in a working state. Correspondingly, when one feeding arm in the second feeding arm group is in a working state, the other feeding arm in the second feeding arm group may also be in a working state. That is, the feeding arms in the same feeding arm group work simultaneously.

Optionally, in the embodiments of the present disclosure, when the feeding arm in the first feeding arm group is in a working state, the feeding arm in the second feeding arm group may be in a working state or may not be in a working state. This may be determined according to an actual usage requirement, and is not limited in the embodiments of the present disclosure.

In the embodiments of the present disclosure, the first feeding arm group and the second feeding arm group are orthogonally distributed, amplitudes of signal sources connected to two feeding components that are electrically connected to the two feeding arms in the same feeding arm group are the same, and phases of the signal sources differ by 180 degrees. Therefore, isolation between antenna paths formed by the first feeding arm group and the second feeding arm group may be improved, thereby improving the performance of the antenna element.

Optionally, in the embodiments of the present disclosure, the shape of the first insulator may be the same as the shape of the opening of the target metal groove, for example, any possible shape such as a cuboid or a cylinder.

It should be noted that in the embodiments of the present disclosure, the shape of the first insulator may also be any shape that may meet actual use requirements. This may be determined according to an actual usage requirement, and is not limited in the embodiments of the present disclosure.

Optionally, in the embodiments of the present disclosure, the material of the first insulator may be an insulating material with relative permittivity less than 3.

Optionally, in the embodiments of the present disclosure, the material of the first insulator may be any possible material such as plastic or foam. This may be determined according to an actual usage requirement, and is not limited in the embodiments of the present disclosure.

Exemplarily, in an embodiment of the present disclosure, the material of the first insulator may be plastic with the relative permittivity of 2.2.

In the embodiments of the present disclosure, the first insulator may not only carry the target radiator, but also may isolate the target radiator from the M feeding arms, thereby preventing interference between the target radiator and the M feeding arms.

It should be noted that in the embodiments of the present disclosure, under the premise of carrying the target radiator, as the relative permittivity of the material of the first insulator is smaller, the first insulator has fewer effects on the radiation effect of the antenna element. In other words, as the relative permittivity of the material of the first insulator is smaller, the first insulator has fewer effects on the working performance of the antenna element and better radiation effects of the antenna element are ensured.

Optionally, in the embodiments of the present disclosure, the target radiator may be a polygonal radiator.

Optionally, in the embodiments of the present disclosure, the target radiator may be any possible polygonal radiator, such as a rectangular radiator, a hexagonal radiator, or a square radiator. This may be determined according to an actual usage requirement, and is not limited in the embodiments of the present disclosure.

Certainly, in actual implementation, the shape of the target radiator may also be any possible shapes, which may be determined according to actual use requirements and is not limited in the embodiments of the present disclosure.

Optionally, in an embodiment of the present disclosure, as shown in FIG. 4 or FIG. 5, the area of the target radiator 204 may be smaller than the area of the opening of the second metal groove 201*b*.

In an embodiment of the present disclosure, the frequency of the electromagnetic wave generated by coupling between the target radiator and the M feeding arms is related to the area of the target radiator. For example, as the area of the target radiator is smaller, the frequency of the electromagnetic wave generated by the coupling between the target radiator and the M feed arms is higher. Therefore, the target radiator is disposed as a polygonal radiator, so that the target radiator and the M feeding arms are coupled to generate a high-frequency electromagnetic wave. Thus, the antenna element provided in the embodiments of the present disclosure may work in a 5G millimeter-wave band.

Optionally, in the embodiments of the present disclosure, a resonance frequency of the target radiator may be a first frequency, and a resonance frequency of the target metal groove may be a second frequency.

The first frequency may be higher than the second frequency.

In an embodiment of the present disclosure, since resonance frequencies of different radiators are different, the resonance frequency of the target radiator and the resonance frequency of the target metal groove may be different frequencies, so that the antenna element may cover different bands.

Figure 6:
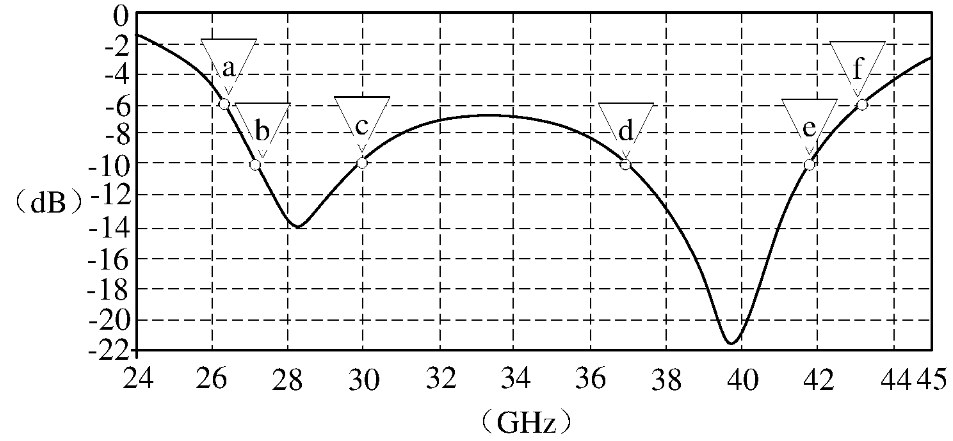
FIG. 6 is a diagram of a reflection coefficient of an antenna element according to an embodiment of the present disclosure.

Exemplarily, assuming that the target radiator is a square radiator, as shown in FIG. 6, which is a diagram of a reflection coefficient of an antenna element when the antenna element works according to an embodiment of the present disclosure. When the return loss is −6 dB (decibel), the frequency range covered by the antenna element may be 26.3 GHz to 43.1 GHz, and the frequency range may include multiple millimeter-wave bands (such as n257, n259, n261, and n260). When the return loss is −10 dB, the frequency range covered by the antenna element may include 27.2 GHz to 29.7 GHz and 36.9 GHz to 41.7 GHz, and the two frequency ranges include multiple main millimeter-wave bands (such as n261 and n260). In this way, the antenna element provided by the embodiments of the present disclosure may cover most 5G millimeter-wave bands (for example, mainstream 5G millimeter-wave bands such as n257, n259, n260, and n261), which may improve antenna performance of the terminal device.

It should be noted that, in the embodiments of the present disclosure, when the return loss of the antenna element is less than −6 dB, the antenna element may meet actual use requirements; when the return loss of the antenna element is less than −10 dB, the performance of the antenna element is better. A point a, a point b, a point c, a point d, a point e, and a point f in FIG. 6 are used to mark return loss values. As may be seen from FIG. 6, return loss values marked by the point a and the point f are −10, and return loss values marked by the point b, the point c, the point d, and the point e are −6. That is, the antenna element provided by the embodiments of the present disclosure may ensure better performance while meeting actual usage requirements.

Optionally, in the embodiments of the present disclosure, the target radiator may be flush to the surface on which the opening of the target metal groove is located.

Optionally, in the embodiments of the present disclosure, when the target metal groove includes a first metal groove and a second metal groove, the target radiator may be flush to the surface of the opening of the first metal groove.

Figure 7:
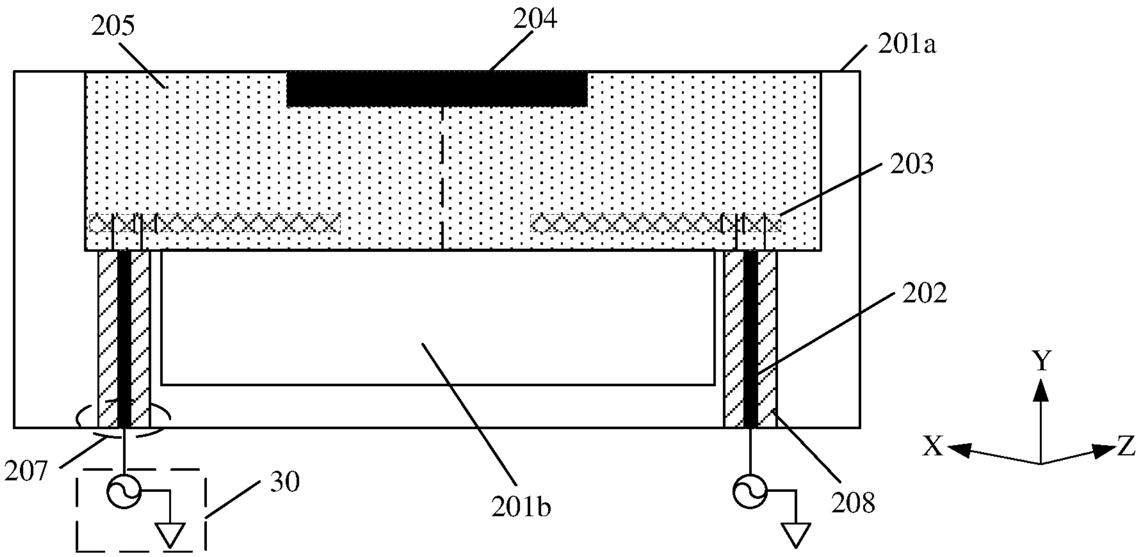
FIG. 7 is a cutaway view of an antenna element according to an embodiment of the present disclosure.

Exemplarily, as shown in FIG. 7, the target radiator 204 is flush to the surface of the opening of the first metal groove 201*a*.

It should be noted that, as shown in FIG. 7, the target radiator 204 is carried on the first insulator 205; and the feeding component 202 is provided at the bottom of the first metal groove 201*a* and penetrates through the bottom of the first metal groove 201*a*.

Certainly, in actual implementation, the target radiator may also be located at any possible position of the target metal groove. This may be determined according to actual usage requirements and is not limited in the embodiments of the present disclosure.

In the embodiments of the present disclosure, due to different positions of the target radiator, the performance of the antenna element may also be different. Therefore, the position of the target radiator may be set according to actual use requirements, which may make the design of the antenna element more flexible.

Optionally, in the embodiments of the present disclosure, the antenna element may further include a second insulator disposed between the bottom of the target metal groove and the first insulator, and the M feeding arms are carried on the second insulator.

Optionally, in the embodiments of the present disclosure, the shape of the second insulator may be the same as the shape of the opening of the target metal groove, for example, any possible shape such as a cuboid or a cylinder.

It should be noted that, in the embodiments of the present disclosure, the shape of the second insulator may be any shape that may meet actual use requirements. This is not limited in the embodiments of the present disclosure and may be determined according to actual use requirements.

Optionally, in the embodiments of the present disclosure, the material of the second insulator may be an insulating material with relative permittivity less than 3.

Optional, in the embodiments of the present disclosure, the material of the second insulator may be any possible material such as plastic or foam. This may be determined according to an actual usage requirement, and is not limited in the embodiments of the present disclosure.

Exemplarily, in an embodiment of the present disclosure, the material of the second insulator may be plastic with relative permittivity of 2.5.

It should be noted that in the embodiments of the present disclosure, under the premise of carrying the M feeding arms, as the relative permittivity of the material of the second insulator is smaller, the second insulator has fewer effects on the radiation effect of the antenna element. In other words, as the relative permittivity of the material of the second insulator is smaller, the second insulator has fewer effects on the working performance of the antenna element and ensures better radiation effects of the antenna element.

Optionally, in the embodiments of the present disclosure, when the target metal groove includes the first metal groove and the second metal groove, the second insulator may be disposed between the bottom of the first metal groove and the first insulator.

Optionally, in the embodiments of the present disclosure, the material of the second insulator may be the same as the material of the first insulator.

In the embodiments of the present disclosure, when the material of the second insulator is the same as the material of the first insulator, the second insulator may be regarded as a part of the first insulator. In this way, the M feeding arms may also be carried on the first insulator.

Exemplarily, as shown in FIG. 7, the M feeding components 203 are carried on the first insulator 205.

In the embodiments of the present disclosure, the second insulator may not only carry the M feeding arms, but also may isolate the M feeding arms from the target metal groove, to prevent interference between the M feeding arms and the target metal groove.

Optionally, in the embodiments of the present disclosure, as shown in FIG. 7, the bottom of the first metal groove 201*a* may also be provided with M through holes 207 penetrating through the bottom of the first metal groove 201*a*, and each feeding component 202 of the M feeding components may be disposed in a through hole 207.

Optionally, in the embodiments of the present disclosure, the M through holes may be through holes with the same diameter.

Optionally, in the embodiments of the present disclosure, the M through holes may be distributed on the diagonal of the first metal groove. The distribution method may be determined based on the distribution positions of the M feeding components in the first metal groove, which is not limited in the embodiments of the present disclosure.

In the embodiments of the present disclosure, the through holes penetrating through the bottom of the first metal groove are disposed at the bottom of the first metal groove, and the M feeding components are disposed in the through holes, so that the M feeding components are disposed at the bottom of the first metal groove and penetrate through the bottom of the first metal groove, which may simplify the process in which the feeding component penetrates through the first metal groove.

Optionally, in the embodiments of the present disclosure, a third insulator may be disposed in each through hole, and the third insulator may be disposed around the feeding component.

In the embodiments of the present disclosure, the third insulator is disposed around the feeding component, so that the feeding component may be fixed in the through hole.

Exemplarily, as shown in FIG. 7, the bottom of the first metal groove 201*a* is provided with a through hole 207, a third insulator 208 is disposed in each through hole 207, and the feeding component 202 may penetrate through the third insulator 208 provided in the through hole 207 and is electrically connected to the feeding arm 203.

It should be noted that a signal source 30 connected to one end of the feeding component 202 in FIG. 7 may be a millimeter-wave signal source of the terminal device.

In the embodiments of the present disclosure, the material of the third insulator may be an insulating material with relatively small relative permittivity.

Exemplarily, the material of the third insulator may be any possible material such as a foam material or a plastic material.

Optionally, in the embodiments of the present disclosure, the material of the third insulator may be the same as or different from the material of the first insulator. This may be determined according to an actual usage requirement, and is not limited in the embodiments of the present disclosure.

In the present disclosure, on the one hand, since the diameter of the through hole may be greater than the diameter of the feeding component, when the feeding component is disposed in the through hole, the feeding component may not be fixed in the through hole. Therefore, the third insulator is disposed in the through hole and the third insulator is disposed around the feeding component, so that the feeding component may be fixed in the through hole. On the other hand, because the first metal groove and the feeding component are metal materials, during the operation of the antenna element, interference may occur between the first metal groove and the feeding component. Therefore, the feeding component may be insulated from the first metal groove by adding the third insulator to the through hole, so that the feeding component is insulated from the first metal groove, which may make the antenna performance of the terminal device more stable.

It should be noted that, in the embodiments of the present disclosure, the antenna element shown in each of the accompanying drawings is illustrated with reference to an accompanying drawing in the embodiments of the present disclosure. In implementation, the antenna element shown in each of the accompanying drawings may also be implemented with reference to any other accompanying drawings that may be combined in the above embodiments, which is not repeated herein.

The embodiments of the present invention provide a terminal device. The terminal device may include the antenna element provided in any one of the embodiments of the present invention shown in FIG. 2 to FIG. 7. For description of the antenna element, refer to related description of the antenna element in the embodiments. Details are not described herein again.

The terminal device in the embodiments of the present disclosure may be a mobile terminal or a non-mobile terminal. For example, the mobile terminal may be a mobile phone, a tablet computer, a notebook computer, a palmtop computer, a vehicle-mounted terminal, a wearable device, an ultra-mobile personal computer (UMPC), a netbook, a personal digital assistant (PDA), or the like. The non-mobile terminal may be a personal computer (PC), a television (TV), or the like. This is not limited in the embodiment of the present disclosure.

Optionally, in the embodiments of the present disclosure, a housing of the terminal device may be provided with at least one first groove, and each antenna element may be disposed in a first groove.

In the embodiments of the present disclosure, the at least one first groove may be disposed in the housing of the terminal device, and the antenna element provided by the embodiments of the present disclosure may be disposed in the first groove, so that at least one antenna element provided by the embodiments of the present disclosure is integrated in the terminal device.

Optionally, in the embodiments of the present disclosure, the first groove may be disposed in the frame of the housing of the terminal device.

Figure 8:
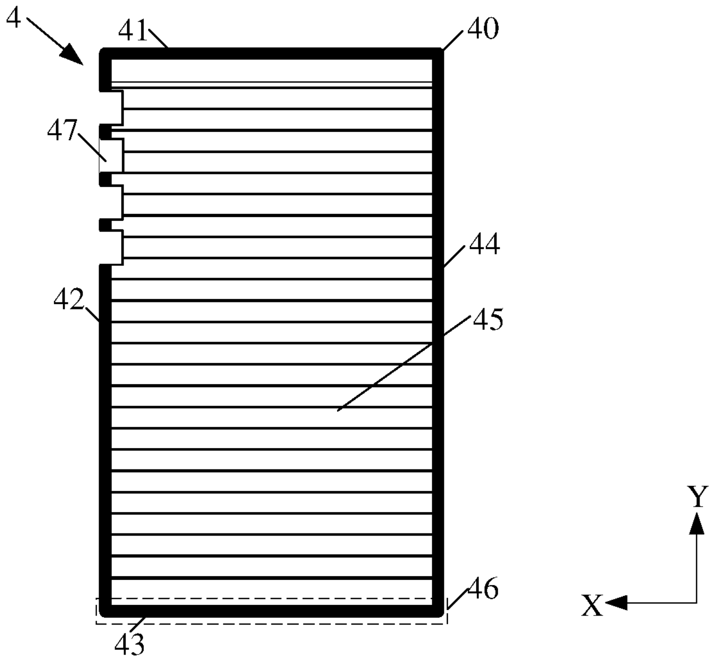
FIG. 8 is a first schematic structural diagram of hardware of a terminal device according to an embodiment of the present disclosure.

In the embodiments of the present disclosure, as shown in FIG. 8, the terminal device 4 may include a housing 40. The housing 40 may include a first metal frame 41, a second metal frame 42 connected to the first metal frame 41, a third metal frame 43 connected to the second metal frame 42, and a fourth metal frame 44 connected to the third metal frame 43 and the first metal frame 41. The terminal device 4 may also include a ground plate 45 connected to the second metal frame 42 and the fourth metal frame 44, and a first antenna 46 disposed in an area enclosed by the third metal frame 43, a part of the second metal frame 42, and a part of the fourth metal frame 4 (for example, these metal frames may also be a part of the first antenna). The first groove 47 is provided on the second metal frame 42. In this way, the antenna element provided by the embodiments of the present disclosure may be disposed in the first groove, so that an array antenna module formed by the antenna element provided by the embodiments of the present disclosure may be included in the terminal device. Therefore, this may implement the design of integrating the antenna element provided by the embodiments of the present disclosure in the terminal device.

In the embodiments of the present disclosure, the ground plate may be any part that may be used as a virtual ground, for example, a PCB or a metal frame of the terminal device or a display screen of the terminal device.

It should be noted that in the embodiments of the present disclosure, the first antenna may be a communication antenna of a second-generation mobile communication system (that is, a 2G system), a third-generation mobile communication system (that is, a 3G system), a fourth-generation mobile communication system (that is, a 4G system), or the like. The antenna element integrated in the terminal device (the antenna element formed by the groove structure and the target insulating layer located in the groove structure) may be an antenna of the 5G system of the terminal device.

Optionally, in the embodiments of the present disclosure, the first metal frame, the second metal frame, the third metal frame, and the fourth metal frame may be connected in a head-to-tail manner in sequence to form a closed frame; or some of the first metal frame, the second metal frame, the third metal frame, and the fourth metal frame may be connected to form a semi-closed frame; or the first metal frame, the second metal frame, the third metal frame, and the fourth metal frame may not be interconnected to form an open frame. This may be determined according to an actual usage requirement, and is not limited in the embodiments of the present disclosure.

It should be noted that the frame included in the housing 40 shown in FIG. 8 is illustrated by using an example of a closed frame formed by connecting the first metal frame 41, the second metal frame 42, the third metal frame 43, and the fourth metal frame 44 in a head-to-tail manner in sequence. This does not impose any limitation on the embodiments of the present disclosure. An implementation of a frame formed by connecting the first metal frame, the second metal frame, the third metal frame, and the fourth metal frame in other connection methods (some frames are connected or frames are not interconnected) is similar to the implementation provided in the embodiments of the present disclosure. To avoid repetition, this is not repeated herein.

Optionally, in the embodiments of the present disclosure, at least one first groove may be provided in the same frame of the housing, or may be provided in different frames. This may be determined according to an actual usage requirement, and is not limited in the embodiments of the present disclosure.

Optionally, in the embodiments of the present disclosure, multiple first grooves may be provided on the housing of the terminal device, so that multiple antenna elements provided by the embodiments of the present disclosure may be provided in the terminal device. In this way, multiple antenna elements may be included in the terminal device, to improve the antenna performance of the terminal device.

In the embodiments of the present disclosure, when multiple antenna elements are provided in the terminal device, according to the structure of the antenna element, the distance between two adjacent first grooves may be reduced, that is, the distance between two adjacent antenna elements may be reduced. In this way, when the terminal device includes a smaller number of antenna elements, the beam scanning angle of the electromagnetic wave generated by the target radiator and the target metal groove in the antenna element may be increased, thereby increasing communication coverage of the millimeter-wave antenna of the terminal device.

In the embodiments of the present disclosure, at least one first groove may be provided on the housing of the terminal device, and an antenna element provided by the embodiments of the present disclosure may be provided in each first groove, so that at least one antenna element provided by the embodiments of the present disclosure may be integrated in the terminal device, to improve the antenna performance of the terminal device.

Optionally, in the embodiments of the present disclosure, the target metal groove may be a part of the housing of the terminal device. It may be understood that the target metal groove may be a groove provided on the housing of the terminal device.

The housing of the terminal device may be a radiator of a cellular antenna or a radiator of a non-cellular antenna.

Optionally, in the embodiments of the present disclosure, the housing of the terminal device may be a radiator of a cellular antenna, or a radiator of a non-cellular antenna, or a radiator of a cellular antenna and a radiator of a non-cellular antenna. This may be determined according to an actual usage requirement, and is not limited in the embodiments of the present disclosure.

Optionally, in the embodiments of the present disclosure, the target metal groove may be disposed in the metal frame of the housing of the terminal device.

Figure 9:
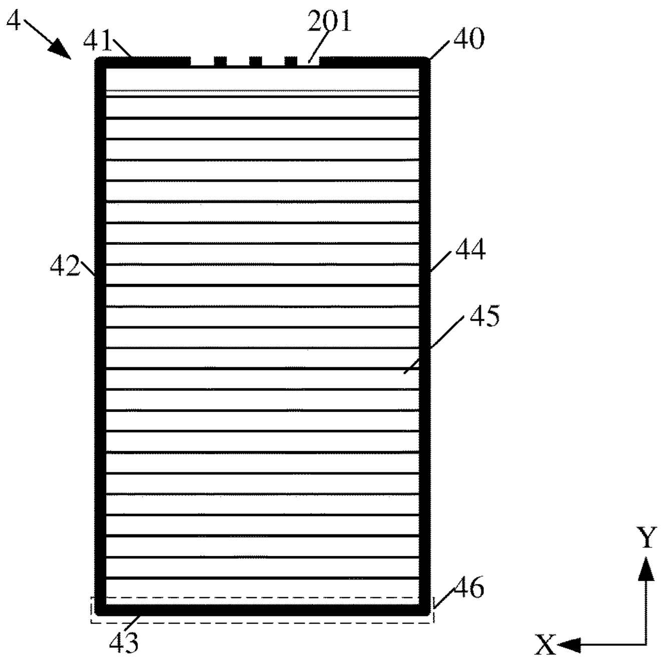
FIG. 9 is a second schematic structural diagram of hardware of a terminal device according to an embodiment of the present disclosure.

Exemplarily, as shown in FIG. 9, the housing 40 of the terminal device 4 provided by the embodiments of the present disclosure may be provided with at least one target metal groove 201, the first insulator, the M feeding arms, and the M feeding arms in the antenna element. Target radiators carried on the first insulator may all be disposed in the target metal groove (based on the angle of the terminal device shown in FIG. 9, the target metal groove is actually invisible).

Optionally, in the embodiments of the present disclosure, one target metal groove may be provided in the first metal frame, the second metal frame, the third metal frame, or the fourth metal frame of the housing. This may be determined according to an actual usage requirement, and is not limited in the embodiments of the present disclosure.

It may be understood that, when the target metal groove is provided on the frame (for example, the first metal frame) of the housing, the side wall of the target metal groove, the bottom of the target metal groove, and other parts included in the target metal groove in the embodiments of the present disclosure are all a part of the terminal device, and may be a part of the frame of the housing provided by the embodiments of the present disclosure.

In the embodiments of the present disclosure, the housing of the terminal device may also be a radiator of a non-millimeter-wave antenna in the terminal device, so that the space occupied by the antenna in the terminal device may be greatly reduced.

It should be noted that in the embodiments of the present disclosure, FIG. 9 illustrates by using an example in which the target metal groove 201 is disposed on the first metal frame 41 of the housing 40, and the direction of the opening of the target metal groove 201 is the positive direction of the Y axis of the coordinate system shown in FIG. 9.

It may be understood that in the embodiments of the present disclosure, as shown in FIG. 9, when the target metal groove is provided in the second metal frame of the housing, the direction of the opening of the target metal groove may be the positive direction of the X axis; when the target metal groove is provided on the third metal frame of the housing, the direction of the opening of the target metal groove may be the negative direction of the Y-axis; when the target metal groove structure is provided on the fourth metal frame of the housing, the direction of the opening of the target metal groove may be the negative direction of the X axis.

Optionally, in the embodiments of the present disclosure, the target metal groove may be provided in the housing of the terminal device, and components such as the first insulator may be provided in each target metal groove, so that the terminal device may be integrated with multiple antenna elements provided by the embodiments of the present disclosure. In this way, the antenna elements may form an antenna array, so that the antenna performance of the terminal device may be improved.

Optionally, in the embodiments of the present disclosure, when the terminal device is integrated with multiple antenna elements provided by the embodiments of the present disclosure, the distance between two adjacent antenna elements (that is, the distance between two adjacent target metal grooves) may be determined according to the isolation of the antenna element and the scanning angle of the antenna array formed by the multiple antenna elements. This may be determined according to an actual usage requirement, and is not limited in the embodiments of the present disclosure.

Optionally, in the embodiments of the present disclosure, the number of target metal grooves provided in the housing of the terminal device may be determined according to the size of the structure of the target metal groove and the size of the housing of the terminal device. The embodiments of the present disclosure do not limit this.

Figure 10:
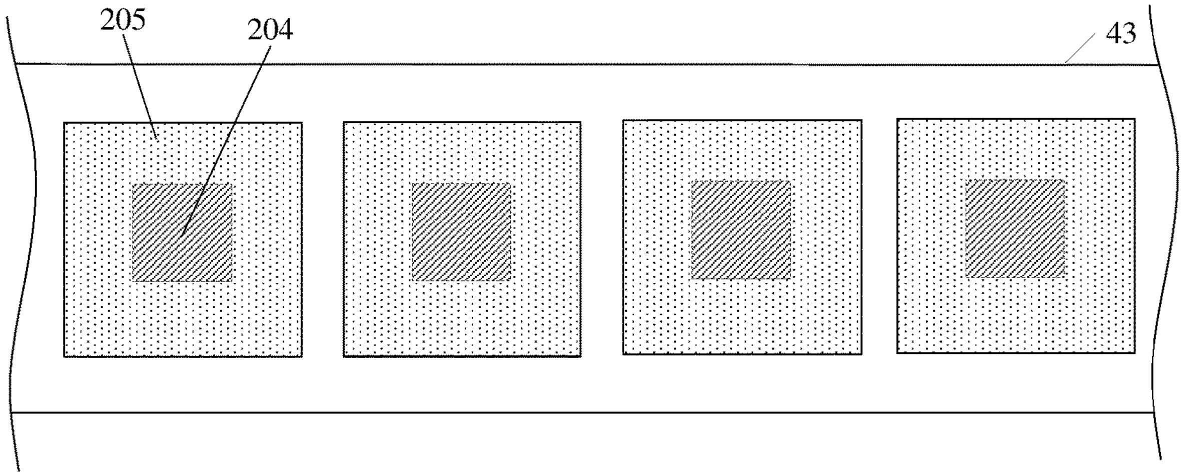
FIG. 10 is a bottom view of a terminal device according to an embodiment of the present disclosure.

Exemplarily, FIG. 10 is a bottom view of multiple antenna elements provided on the housing in the positive direction of the Y axis (the coordinate system shown in FIG. 9) according to an embodiment of the present disclosure. As shown in FIG. 10, the third metal frame 43 is provided with multiple antenna elements provided by the embodiments of the present disclosure (each antenna element includes the target metal groove on the housing, the first insulator located in the target metal groove, and the like). The first insulator 205 is set in the target metal groove (not shown in FIG. 10), and the target radiator 204 is carried in the first insulator 205.

It should be noted that in the embodiments of the present disclosure, FIG. 10 only illustrates by using an example of four antenna elements provided on the third metal frame, and does not constitute any limitation on the embodiments of the present disclosure. It may be understood that, during implementation, the number of antenna elements provided on the third metal frame may be determined according to actual use requirements, and the embodiments of the present disclosure do not limit this.

An embodiment of the present disclosure provides a terminal device. The terminal device includes an antenna element. The antenna element may include a target metal groove, M feeding components disposed at the bottom of the target metal groove, M feeding arms and a first insulator disposed in the target metal groove, and a target radiator carried by the first insulator. Each feeding component of the M feeding components is electrically connected to a feeding arm, the M feeding components are isolated from the target metal groove, the M feeding arms are located between the bottom of the target metal groove and the first insulator, the M feeding arms are distributed along the diagonal direction of the target metal groove, each feeding arm of the M feeding arms is coupled to the target radiator and the target metal groove, a resonance frequency of the target radiator is different from a resonance frequency of the target metal groove, and M is a positive integer. In this solution, on the one hand, since the feeding arm is coupled to the target radiator and the target metal groove, when the feeding arm receives an AC signal, the feeding arm may be coupled to the target radiator and the target metal groove. Therefore, the target radiator and the target metal groove may generate induced AC signals, so that the feeding arm, the target radiator, and the target metal groove generate electromagnetic waves of a particular frequency. In addition, because the target radiator and the target metal groove generate induced currents at different positions (paths through which currents flow are different), frequencies of electromagnetic waves generated by the current on the feeding arm through the target radiator and the target metal groove are also different, so that the antenna element may cover different bands, that is, the band covered by the antenna element may be increased. On the other hand, because the M feeding arms are located between the bottom of the target metal groove and the first insulator, and the M feeding arms are distributed along the diagonal direction of the target metal groove, the volume of the antenna element may be appropriately reduced while the performance of the antenna element may be ensured, thereby making the structure of the antenna element more compact. In this way, since the band covered by the antenna element may be increased and compactness of the structure of the antenna element may be increased, the performance of the antenna element may be improved.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art may still derive many variations without departing from the essence of the present disclosure and the protection scope of the claims. All these variations shall fall within the protection of the present disclosure.

What is claimed is:

1. An antenna element, comprising a target metal groove, M feeding components disposed at the bottom of the target metal groove, M feeding arms and a first insulator disposed in the target metal groove, and a target radiator carried by the first insulator;

wherein each feeding component of the M feeding components is electrically connected to a feeding arm, the M feeding components are isolated from the target metal groove, the M feeding arms are located between the bottom of the target metal groove and the first insulator, the M feeding arms are distributed along the diagonal direction of the target metal groove, each feeding arm of the M feeding arms is coupled to the target radiator and the target metal groove, a resonance frequency of the target radiator is different from a resonance frequency of the target metal groove, and M is a positive integer.

2. The antenna element according to claim 1, wherein the target metal groove comprises a first metal groove and a second metal groove that is disposed at the bottom of the first metal groove;

wherein a first side wall of the first metal groove is not in parallel with a second side wall of the second metal groove, the M feeding components are disposed at the bottom of the first metal groove, the M feeding arms and the first insulator are disposed in the first metal groove, and each feeding arm is coupled to the target radiator and the second metal groove.

3. The antenna element according to claim 2, wherein the first metal groove and the second metal groove are rectangular grooves.

4. The antenna element according to claim 2, wherein the opening of the first metal groove is larger than the opening of the second metal groove.

5. The antenna element according to claim 3, wherein the opening of the first metal groove is larger than the opening of the second metal groove.

6. The antenna element according to claim 2, wherein the M feeding components are disposed at the bottom of the first metal groove and penetrate through the bottom of the first metal groove.

7. The antenna element according to claim 1, wherein the M feeding arms are two feeding arms, and the two feeding arms are disposed opposite to each other in the target metal groove.

8. The antenna element according to claim 7, wherein an axis of symmetry of the two feeding arms is in parallel with a diagonal of the target radiator.

9. The antenna element according to claim 1, wherein the M feeding arms comprises four feeding arms, the four feeding arms form two feeding arm groups, and each feeding arm group comprises two feeding arms disposed opposite to each other.

10. The antenna element according to claim 9, wherein the two feeding arm groups comprise a first feeding arm group and a second feeding arm group, feeding arms in the first feeding arm group are distributed on a first diagonal of the target metal groove, and feeding arms in the second feeding arm group are distributed on a second diagonal of the target metal groove.

11. The antenna element according to claim 1, wherein the target radiator is a polygon radiator.

12. The antenna element according to claim 1, wherein a resonance frequency of the target radiator is a first frequency, and a resonance frequency of the target metal groove is a second frequency;

wherein the first frequency is higher than the second frequency.

13. The antenna element according to claim 1, wherein the target radiator is flush to a surface on which the opening of the target metal groove is located.

14. The antenna element according to claim 1, wherein the antenna element further comprises a second insulator disposed between the bottom of the target metal groove and the first insulator, and the M feeding arms are carried on the second insulator.

15. A terminal device, comprising at least one antenna element, wherein one of the at least one antenna element comprises: a target metal groove, M feeding components disposed at the bottom of the target metal groove, M feeding arms and a first insulator disposed in the target metal groove, and a target radiator carried by the first insulator; and each feeding component of the M feeding components is electrically connected to a feeding arm, the M feeding components are isolated from the target metal groove, the M feeding arms are located between the bottom of the target metal groove and the first insulator, the M feeding arms are distributed along the diagonal direction of the target metal groove, each feeding arm of the M feeding arms is coupled to the target radiator and the target metal groove, a resonance frequency of the target radiator is different from a resonance frequency of the target metal groove, and M is a positive integer.

16. The terminal device according to claim 15, wherein a housing of the terminal device is provided with at least one first groove, and each antenna element is disposed in a first groove.

17. The terminal device according to claim 15, wherein the target metal groove of the antenna element is a part of the housing of the terminal device;

wherein the housing of the terminal device is a radiator of a cellular antenna or a radiator of a non-cellular antenna.

* * * * *